United States Patent [19]

Prime, Jr.

[11] 4,384,292
[45] May 17, 1983

[54] ELECTRONIC COUNTER-COUNTER-MEASURE DEVICE

[76] Inventor: Kermit L. Prime, Jr., P.O. Box 54, Astor, Fla. 32002

[21] Appl. No.: 64,152

[22] Filed: Aug. 4, 1970

[51] Int. Cl.³ .............................................. G01S 7/36
[52] U.S. Cl. .................................................. 343/18 E
[58] Field of Search ..................................... 343/18 E

[56] References Cited

U.S. PATENT DOCUMENTS

| | | | |
|---|---|---|---|
| 3,011,053 | 11/1961 | Sev | 343/18 E |
| 3,219,826 | 11/1965 | Letaw, Jr. | 343/18 E |
| 3,278,936 | 10/1966 | Wolf | 343/18 E |
| 3,365,718 | 1/1968 | Borg | 343/18 E |
| 3,887,919 | 6/1975 | Christensen et al. | 343/18 E |

Primary Examiner—T. H. Tubbesing
Attorney, Agent, or Firm—Robert F. Beers; Robert W. Adams

[57] ABSTRACT

E.C.C.M. (electronic counter-counter-measure) method and device operated in connection with tracking radar to degrade the effectiveness of D.E.C.M. (deceptive electronic counter-measure) means employed by targets to present a false return to the tracking radar. The E.C.C.M. is accomplished by shutting off the radar receiver during a brief time period when the false return is expected. Means for doing this in the critically short time periods involved are described.

8 Claims, 11 Drawing Figures

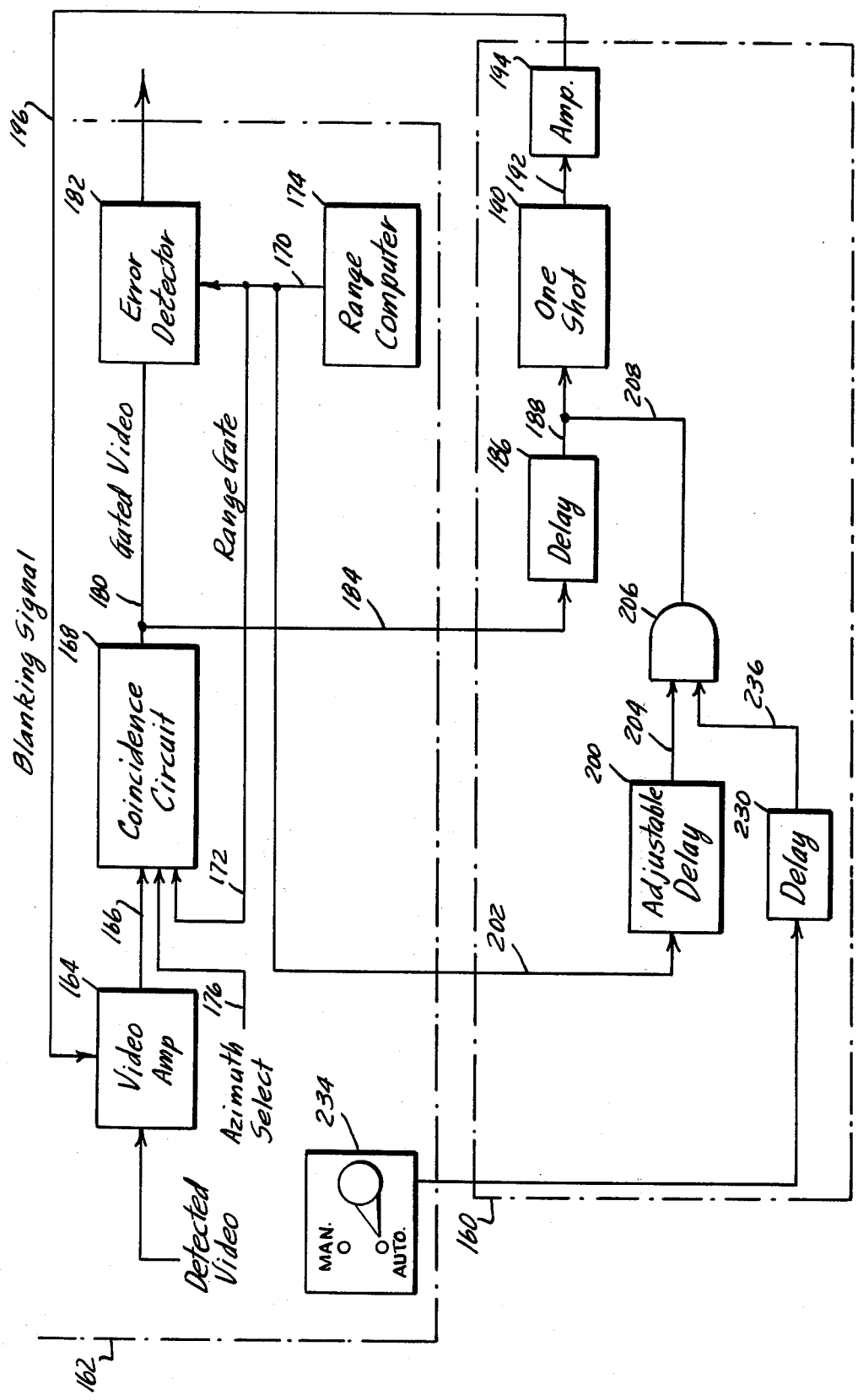

ELECTRONIC COUNTER-COUNTER-MEASURE DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to E.C.C.M. methods and apparatus and more particularly to methods and apparatus for rendering ineffective D.E.C.M. apparatus carried by aircraft and intended to present a false target to tracking radar.

Tracking radars are widely employed, for example at S.A.M. (surface-to-air missile) sites. These radars include automatic ranging circuitry having the capability of "locking on" a designated target after it has been acquired and is being tracked by the radar operator. The ranging circuitry includes error detector means which provides tracking error data as an output. The error data is combined with range data derived from the operator's controls to provide corrected range data which, together with azimuth and elevation data from the radars, can be utilized to guide a S.A.M. accurately to the tracked target. Generally, the error detector means detects shifts in the power of the target video signals along a time reference base and causes a range gate to continually tend to be centered with respect to the target return. In some radars the error detector means utilizes an early gate and a late gate to detect the direction and extent of shift of the target video. In other radars, such as that designated the MSQ-44, the target video is presented in the detector twice, once as early and once as late target video, the early and late video being compared against the range gate which, as before tends to be centered with respect to the target video. The foregoing is generally applicable to conventional tracking radars as well as to more modern TWS (track-while-scan) radars. One distinguishing feature of the TWS radar which the invention takes into account is the fact that TWS radar does not have true target video available at times when the antenna scan is not directed substantially at the target.

Now, in order to avoid the loss of aircraft to enemy S.A.M. action guided by radars having automatic tracking circuitry, it has become the practice to equip probable target aircraft with D.E.C.M. equipment which serves to break the lock on the true target. The D.E.C.M. accomplishes this by providing a stronger false target return which initially at least partially overlaps the true target return. The false return is thereafter progressively delayed according to a predetermined program so that the false target video "walks away" from the true target video. Because the false target has greater power, the error detector means causes the range gate to follow and center on the false target return thereby breaking the lock on the true target and resulting in erroneous range data. Moreover, by further modulating the false return, the D.E.C.M. can cause deceptive azimuth and elevation data to be rendered by the tracking radar.

Although the TWS has target video only when the antenna main lobe is directed toward the target, the D.E.C.M. provides false returns at other times generated from the radar side lobes. These false returns are also effective in breaking the lock on the true target.

SUMMARY OF THE INVENTION

With the foregoing in mind, it is a primary object of this invention to provide an E.C.C.M. method and apparatus which will prevent a false target from being seen in the range gate of a tracking radar, and at the same time will permit the true aircraft return echo to be presented to the tracking error detecting circuitry of the radar.

Another object of this invention is the provision of novel E.C.C.M. apparatus of the foregoing character which takes advantage of the inherent delay introduced by D.E.C.M. equipment to effectively turn off the radar receiver after the true aircraft return is placed in the range gate.

Still another object of the invention is the provision of relatively inexpensive, yet effective, circuitry which can be added to existing tracking radars without materially disturbing the existing circuitry or capabilities thereof.

As another object this invention aims to provide E.C.C.M. methods and apparatus which are useful with a wide variety of tracking radars, both of the normal tracking type and of the more modern TWS type, to degrade or eliminate the effectiveness of the type of deceptive counter-measure discussed above.

Yet another object of the invention is to provide circuitry which is a useful research tool in evaluating the effectiveness of existing and/or newly developed D.E.C.M. gear.

The invention may be further said to reside in certain combinations, arrangements, associations of parts, and/or methods by which the foregoing is accomplished as will be more fully understood from the following detailed description when read in conjunction with the accompanying sheets of drawings.

BRIEF DESCRIPTION OF THE DRAWINGS

FIG. 10 is a diagrammatic illustration, in block form, of another embodiment of the invention for use with TWS radar.

DESCRIPTION OF THE PREFERRED EMBODIMENTS

In the form of the invention illustrated in FIGS. 1–9 and described hereinafter, there is provided an E.C.C.M. device 10 which is shown in association with an automatic range tracking radar receiver 12 of conventional construction. Briefly, the receiver 12 accepts, as an input represented by line 14, radio frequency return signals collected by a suitable antenna. These radio frequency return signals will include, for the purposes of this description, an actual target return 16 (See FIG.

Figure 1:
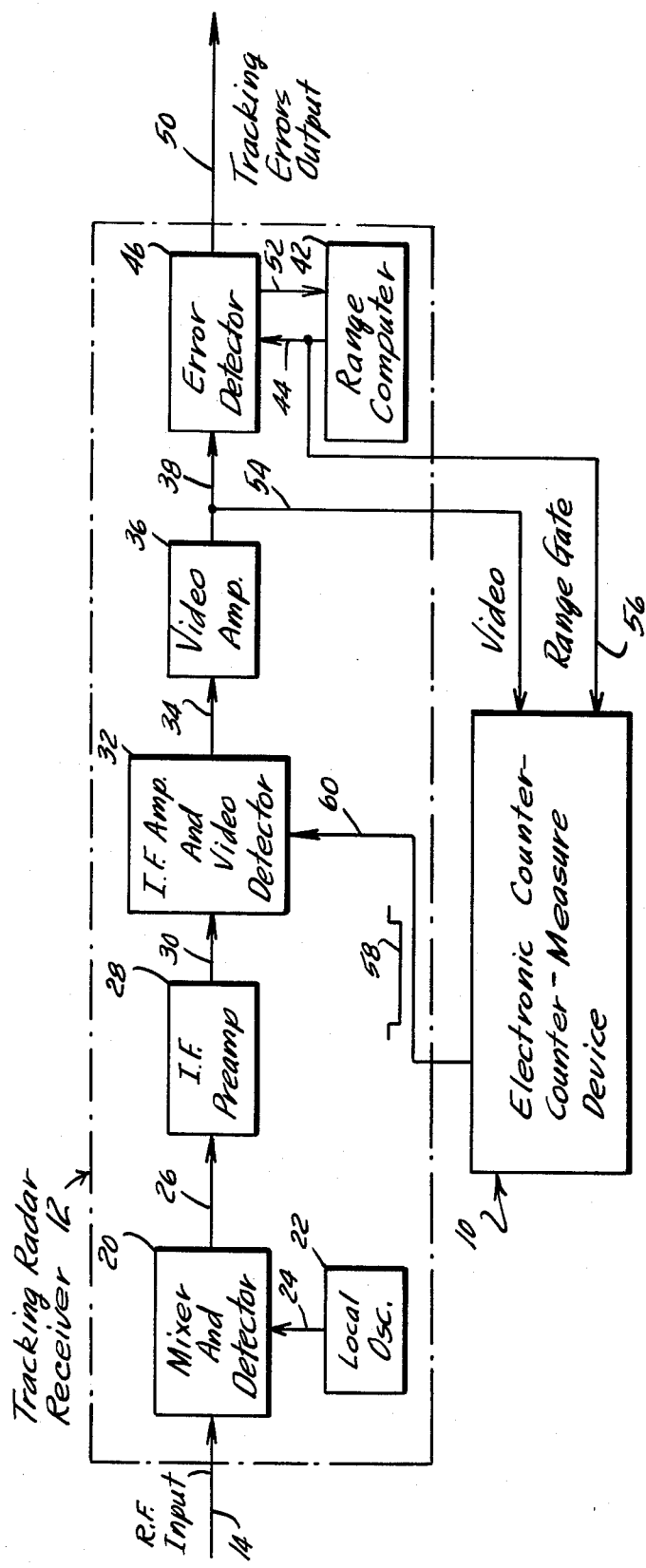
FIG. 1 is a diagrammatic illustration, in block form, of a tracking radar receiver and an E.C.C.M. device embodying the invention.
Figure 2:
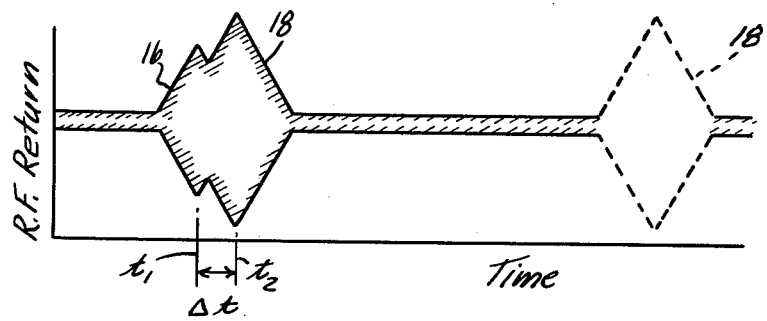
FIGS. 2–7 are graphic illustrations of various waveforms which occur in the operation of the invention.
Figure 3:
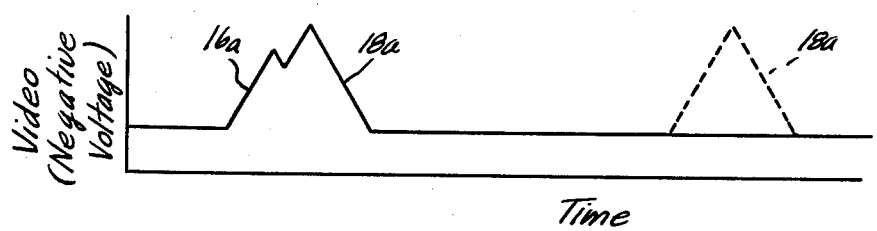
Figure 4:
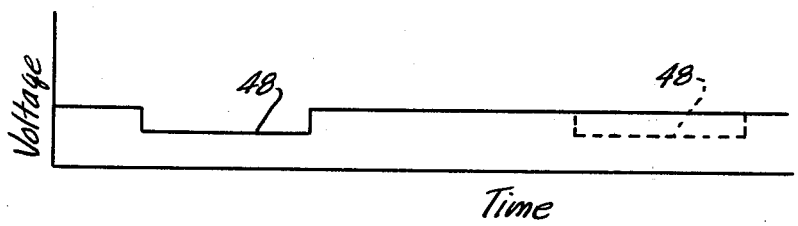
Figure 5:
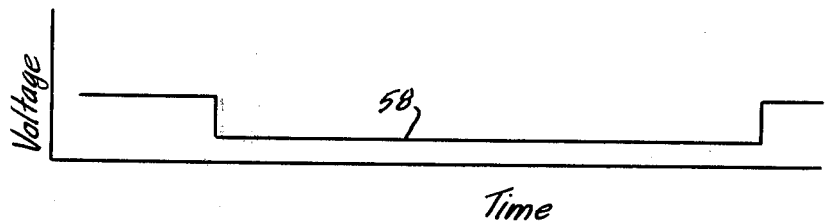

2) and a false target return 18. The peak of the actual target return 16 occurs at a time $t_1$ after the radar transmission which caused it, which time is directly proportional to the target range. The peak of the false target return 18 occurs at a time $t_2$ which differs from the time $t_1$ by an amount $\Delta t$ introduced by the D.E.C.M. gear carried by the target aircraft. This delay is initially on the order of 150 nanoseconds and, according to the D.E.C.M. gear program, is caused to increase progressively with successive returns to say four microseconds. Thus, the false return 18 will appear to walk away from the true return 16 toward the dotted line position of the false return 18 as shown in FIG. 2. It will be noted that the amplitude or strength of the false target return 18 is materially greater than that of the true target return 16.

The RF input on line 14 is processed through conventional mixer and detector means 20, which receives a suitable heterodyning frequency from a local oscillator 22 via line 24, to render a modulated intermediate frequency output on line 26. The intermediate frequency is suitably amplified by an intermediate frequency preamplifier 28 and passed as shown by line 30 to an intermediate frequency amplifier and video detector means 32.

The amplified and detected output on line 34 from the means 32 is processed by video amplifier means 36 to provide amplified video on line 38 comprising true and false video signals 16a and 18a (see FIG. 3) corresponding to the true and false target echoes 16 and 18.

When operating in an automatic tracking mode, a range computer 42 generates range gate signals which are fed, as shown by line 44, to an error detector circuit 46. These range gate signals may include the early and late range gates mentioned before and a range gate signal 48 (see FIG. 4) which starts with the early gate and ends with the late gate. This range gate signal 48, sometimes referred to as the "notch", serves to gate target video to the error detecting portions of the detector 46 and in the case of a typical radar to which the invention has been applied is approximately 0.22 microseconds in width. The error detector circuit 46, which together with the range computer 42 forms the automatic ranging portion of the receiver 12, compares the times of occurrence of the gated target video signals received via line 38 with the early and late gates to produce a tracking errors output as shown by line 50. If the target increases in range the late gate "sees" more power than the early gate and the detector 46 provides an output represented by line 52 which causes the range gate 48 to be shifted to the right until the power seen by the early and late gates is equal. Conversely, if the target decreases in range the early gate sees more power than the late gate and the range gate 48 is shifted to the left until the power seen by the early and late gates is equal. Thus, the range gate 48 is kept centered on the video return. This is, of course, desirable as long as the video return on which the range gate 48 is centered is the true target video 16a. When the D.E.C.M. is operating, however, and the false target video 18a moves toward the dotted line position of FIG. 3, the late gate sees more power and causes the range gate 48 to follow toward the dotted line position thereof in FIG. 4.

Of course, when the tracking radar receiver 12 is so locked in on the false target signal, a missile or the like guided to a supposed target at the range of the false target can be expected to miss the true target and such is the intent of the D.E.C.M. gear.

Figure 6:
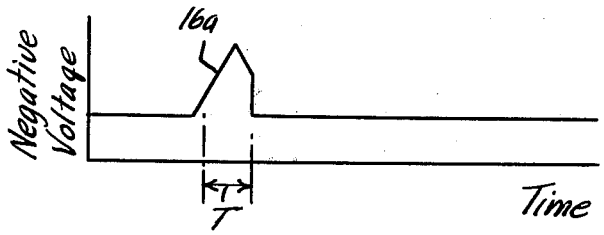
Figure 7:
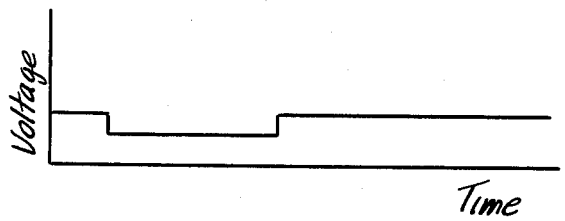

In accordance with the present invention, the E.C.C.M. device 10 operates in response to the video output of amplifier 36 and the range gate signals of the range computer 42 to "turn off" the intermediate frequency amplifier 32 during the time period after most of the true target return 16 is received, and before the false target return 18 is received, thereby permitting only the true target video 16a to pass to the error detector 46 of the automatic ranging portion of the receiver 12. To this end, the device 10 receives the video output of the amplifier 36 as shown by lines 38 and 54, and receives range gate signals 48 from the computer 42 as shown by lines 44 and 56. In the present example, both the video and the range gate inputs to the device 10 constitute negative signals. The output of the device 10 is in the form of blanking pulses 58 (see FIG. 5) applied via line 60 to the I.F. amplifier 32. The blanking pulses 58 serve to turn off the receiver 12 at such a time that the false target video 18a is eliminated leaving only the major portion of the true target video 16a as shown in FIG. 6 to be passed to the error detector 46. Accordingly, the range gate 48 centers on the remaining true target video as shown in FIG. 7 and the fact that D.E.C.M. gear may be providing a false target return 18 is ignored by the receiver 12. Because a small portion of the trailing edge of the video 16a is lost and the range gate centers on the remaining video, there will be a small but relatively constant range error introduced by the device 10. This error can be compensated for at the range read-out. The duration of the blanking pulses 58 is, in one typical installation, on the order of four microseconds. The manner in which timing and duration of the pulses 58 is achieved by the device 10 will be made apparent as the description proceeds.

Figure 8:
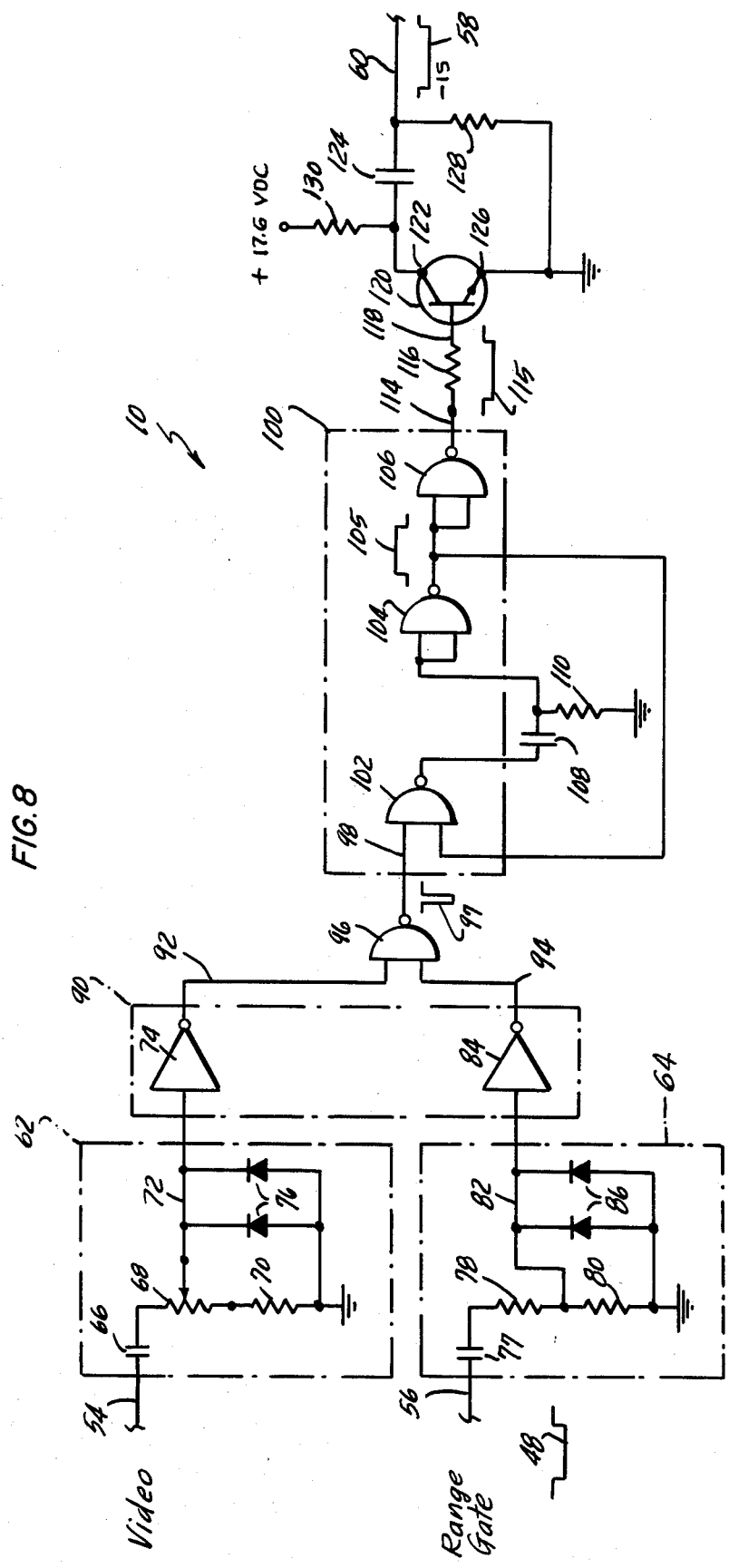
FIG. 8 is a schematic illustration of the E.C.C.M. device of FIG. 1.

Referring now to FIG. 8, the device 10 comprises protection and interface means 62 and 64 which serve to provide appropriate load and impedance conditions for the inputs via lines 54 and 56 respectively. The means 62 comprises a coupling capacitor 66 connected to a voltage divider comprising a potentiometer 68 and a resistor 70. The wiper of the potentiometer 68 is connected via line 72 to an inverter and delay means 74 and serves as a sensitivity control therefor. The RC time of the capacitor 66 and the potentiometer 68 and resistor 70 serves to filter out video noise and reduce it to a D.C. level which will not trigger the inverter and delay means 74 from its normal low state to a high state unless target video is present. The potentiometer 68 provides some degree of timing adjustment by selecting the point along the sloping leading edge of the target video 16a at which the inverter and delay means 74 is triggered. In this regard the resistor 70 is selected to have a high enough value to prevent triggering the inverter 74 even when the potentiometer wiper is closest to the resistor 70. The protection and interface means 62 further comprises diodes 76 connected across the voltage divider output and which serve to prevent highly negative video signals from damaging the inverter and delay means 74.

The interface and protection means 64 is similar to the means 62 and comprises a coupling capacitor 77, a voltage divider including resistors 78 and 80, a line 82 connecting the voltage divider to the input of an inverter and delay means 84, and protection diodes 86. The resistors 78 and 80 establish the impedance to be seen by the input to the inverter means 84. The inverter means 84 is normally in a low state and is triggered to a high state by the leading edge of each range gate 48 derived from the range computer 42.

The inverter and delay means 74 and 84 are conveniently provided together in the form of a single integrated circuit device 90. The outputs of the inverter and delay means 74 and 84 are applied via lines 92 and 94 as inputs to a NAND gate 96 which is a positive logic device. That is to say, the output of the NAND gate 96 on line 98 goes from a high state to a low state when a coincidence of positive inputs exists on lines 92 and 94. Thus, the NAND gate 96 is triggered in response to a format consisting of target video on line 54 and a range gate 48 on line 56. It is convenient to consider the range gate 48 as an enabling pulse and the target video 16a as a triggering signal.

The output 97 on line 98 is applied as a triggering input to an interval timing means 100 which in the present example is in the form of a monostable multivibrator circuit generally referred to as a one-shot. The interval timing means 100 conveniently comprises NAND gates 102, 104, and 106. The output of the gate 102 is coupled to the input of gate 104 by an RC circuit including a capacitor 108 and resistor 110. Part of the output of the gate 104 is fed back as an input to the gate 102 via line 112 and part is fed directly as an input 105 to the gate 106 which serves as an inverter and a driver for a following transistor. The time constant of the capacitor 108 and resistor 110 determines the period of the output of the means 100 which, in this example, is in the form of a positive pulse 115 of about four microseconds duration.

The output of the timing means 100 on line 114 is coupled via a resistor 116 to the base connection 118 of a transistor 120 which is switched thereby. The transistor 120 has its collector connection 122 coupled through a capacitor 124 to the line 60. The emitter connection 126 of the transistor 120 is connected to ground and, through a resistor 128, to the line 60. A positive voltage of approximately 17.6 VDC is connected by a resistor 130 to the collector connection 122, the voltage being derived from a conventional power supply. The transistor 120 is normally in a conductive state so that the collector connection 122, and hence the output line 60, is near ground potential. When biased to a non-conductive state by the pulse 115, the collector voltage rises to approximately 15 volts, rendering a negative 15 volt output on line 60 in the form of the blanking signal 58.

Figure 9:
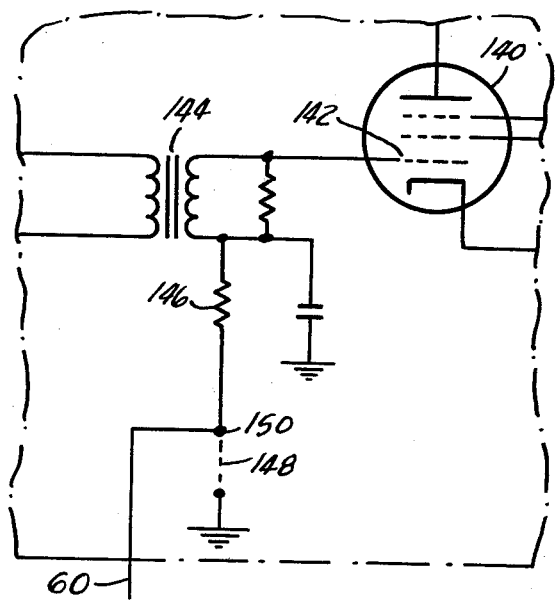
FIG. 9 is a fragmentary illustration, in more detail, of a portion of the radar receiver of FIG. 1, showing the manner of connection of the E.C.C.M. device to the radar receiver.

The blanking signal 58 output on line 60 is, as mentioned earlier, applied to the I.F. amplifier 32 to effectively turn off the receiver for the duration of the blanking signal. Referring now to FIG. 9, a representative amplifier tube 140 of the amplifier 32 of a typical radar receiver comprises a control grid 142 on which the intermediate frequency signals from the mixer and detector 20 are impressed via a coupling transformer 144. The transformer 144 normally has its secondary connected through a resistor 146 and a connection 148 (shown in dotted line form) to ground. In the present example, the connection 148 is removed, and the output line 60 is connected at 150 to the resistor 146. During normal operation, that is when a blanking signal 58 is not present, the connection 150 of resistor 146 is held effectively near ground potential. When a blanking signal 58 occurs, the grid 142 is driven to such a negative condition that the amplifier tube 140 is rendered non-conductive, effectively turning off the receiver 12. The blanking signal 58 may be applied to additional or other amplifying tubes or devices in the I.F. amplifier or other sections of a radar receiver, the particular application of the blanking signal described herein being given by way of example only.

It should be noted at this point (with reference to FIGS. 5 and 6) that although the inverter and delay means 74 is triggered at a point selected along the sloping leading edge of the true video 16a, the blanking signal 58 does not begin until a point along the trailing edge of the true video, preferably that point where the false video 18a would begin to appear as a separate signal. The delay T between the triggering of the means 74 and the start of the blanking signal 58 is necessary to assure reception of the true video and passage thereof to the error detector 46. In the embodiment being described the delay T is approximately 100 nanoseconds and is provided by proper selection of the various components of the device 10 from presently available integrated circuits having very short inherent operating times. The following table of components (types and values), identified by reference numeral, will enable one with ordinary skill in the art to practice the invention without undue experimentation.

COMPONENT capacitor 66—0.1 microfarad
capacitor 77—0.1 microfarad
capacitor 108—0.001 microfarad
capacitor 124—0.2 microfarad
potentiometer 68—50 K ohms
resistor 70—1 K ohms
resistor 78—10 K ohms
resistor 80—1 K ohms
resistor 110—1 K ohms
resistor 116—100 ohms
resistor 128—5.1 K ohms
resistor 130—1.1 K ohms
inverter and delay means 74 & 84—Fairchild type DT L 94959
NAND gate 96—Fairchild type DT$\mu$ L 9937
interval timing means 100—Texas Instruments type SN 7400
transistor 120—2N 2222
diodes 76, 86—IN 933

Figure 11:
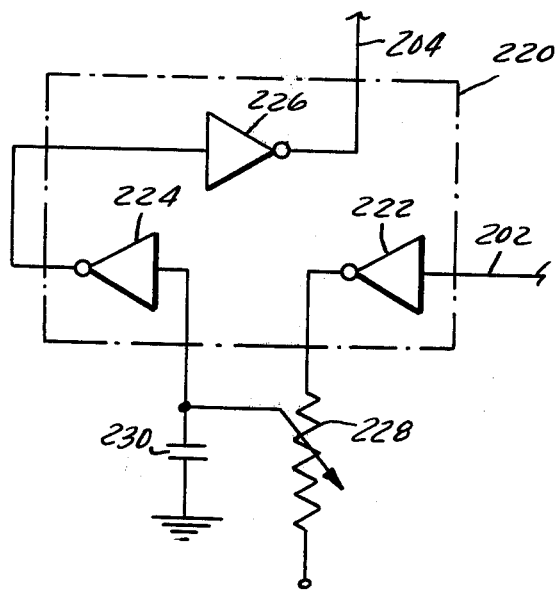
FIG. 11 is a more detailed diagrammatic illustration of the adjustable delay of FIG. 10.

Referring now to FIGS. 10 and 11 there will be described another embodiment of the invention in the form of an E.C.C.M. device 160 which is particularly suited to use with a TWS radar such as the MPQ-47 radar. Some TWS radars are in effect two radars, one operating with vertical scan and one with horizontal scan. While a device 160 is preferably utilized with each, the following description will be confined to the horizontal portion of the radar but is applicable to either the vertical or horizontal portion. It will be recalled that a TWS radar does not illuminate the target with each transmitted pulse and therefore there are periods when no true target video is gated to the error detecting circuitry although the error detector is gated on.

A portion of a TWS radar receiver 162 comprises a video amplifier 164 which provides true and/or false target video via line 166 to a coincidence circuit 168. The other inputs to the coincidence circuit 168 are range gate (signals) via lines 170 and 172 from a range computer 174, and azimuth select gate (signals) via line 176. The coincidence circuit 168 passes gated video line 180 to the error detector 182 of the receiver 162 and corresponds in function to elements 90 and 96 of the earlier described embodiment in that it provides an output on line 184 which can be used to trigger an interval timing means for generation of blanking signals.

While a coincidence circuit such as 168 is found in some TWS radars and its output can be utilized in the practice of the invention as in this description, it will be understood that a separate coincidence circuit or gate device may be utilized as was the case in the earlier described embodiment.

The output on line 184 is applied to a delay 186 which may conveniently be similar to the element 96. This serves to enter a desirable delay in passage of the signal on line 188 to an interval timer in the form of a one shot 190. The one shot 190 is conveniently formed from an integrated circuit device similar to element 100 of FIG. 8, and serves the same purpose, namely to determine the length of the video blanking signal to be generated by the device 160.

The output of the one shot 190 on line 192 is amplified by a suitable amplifier 194 to form a blanking signal which is applied via line 196 to the video amplifier 164. The occurrence of the blanking signal on line 196 shuts off the video in the receiver 162 for each time period during which false target video would be expected.

Thus far the embodiment 160 operates much like the device 10. Because the TWS type radar does not have target video available on line 184 for each transmission pulse while tracking, but only for those transmission pulses which happen to be directed toward the target, and because the D.E.C.M. gear of a target will provide false target video even in the absence of true target video, the invention contemplates the provision of means for initiating blanking signals on line 196 in such absence of true target video. To this end there is provided an adjustable delay means 200 which receives range gate signals via lines 170, 202 from the range computer 174 and delays the leading edges thereof for an adjustably predetermined time. This time is the period during which a true target would be expected to have appeared on line 184 and to have caused the delay 186 to render an output on line 188 to trigger the one shot 190, plus a short time more for a reason which will be made apparent as this description proceeds. The output of the adjustable delay 200 on line 204 is passed by a gate 206 (when enabled), line 208, and line 188 to the one shot 190. Inasmuch as a range gate signal is produced for each radar transmission pulse, a blanking pulse is generated on line 196 for every transmission pulse whether or not video is present.

In the absence of true target video, the delay 200 will assure blanking signals which blank the receiver at a given point in time. That point is ideally a short time after the blanking pulse would occur if there were true target video in the range gate for the one shot 190 to trigger on. This allows the range gate to recenter the modified video for tracking purposes, but prevents the blanking from reducing the video to such a size that the radar would lose its lock and cease tracking.

Referring to FIG. 11, the adjustable delay 200 actually used in practice of the invention comprises an integrated circuit device 220 which is conveniently a Fairchild semiconductor type DTμL 94959 including three inverter amplifiers 222, 224, and 226. The range gate input via line 202 is applied to inverter amplifier 222 which is coupled through an RC circuit to the inverter amplifier 224. The RC circuit comprises a 5 K ohm potentiometer 228, the wiper of which is connected directly to the input of amplifier 224 and by a 330 pf capacitor 230 to ground. The output of inverter amplifier 224 is connected directly to the input of inverter amplifier 226, the output of which is on line 204. Adjustment of the potentiometer 228 provides control of the time at which a blanking signal will be initiated on line 196 in the absence of true video. This circuit 200 is capable of delaying the leading edge of the range gate for almost the entire 700 nanosecond duration thereof in the TWS radar to which the device 160 has been applied.

It has been found in actual use of the invention on a TWS radar with the device 160 operating that making the initial lock on the aircraft to be tracked is somewhat more difficult. This is because the true video, when present, is modified by partial obliteration of the trailing edge thereof by the blanking signal. Accordingly, if the true target video is centered in the range gate as observed by the operator and then he switches to automatic, the error detector circuits see a fairly large apparent error and try to center the range gate as described earlier. When this is done there is some overshoot, sometimes enough that the blanking signal eliminates not only the false target, but the true target video as well and the tracking lock is broken. It is advantageous to provide a means for initiating the operation of the device 160 a short time after the radar tracking function is switched from manual to automatic. Thus, in FIG. 10 a delay means 230 is shown by line 232 to be responsive to operation of the radar receiver manual/automatic tracking selector switch 234 to enable, via line 236, the gate 206 a short time, say a half second, after the selector switch 234 is moved from the manual to the automatic position.

Obviously many modifications and variations of the present invention are possible in the light of the above teachings. It is therefore to be understood that within the scope of the appended claims the invention may be practiced otherwise than as specifically described.

What is claimed is:

1. In combination with a tracking radar, from which are available video and range gate signals, and having first amplifier means and subsequent error detector means, electronic counter-counter-measure means comprising:
   coincidence means for providing an output signal representative of coincidence of the leading edge of true target video and a range gate;
   means responsive to the output of said coincidence means for providing a blanking signal delayed with reference to said coincidence;
   said radar being rendered unresponsive to video received during a predetermined time period following the video upon which the coincidence means has operated.

2. The combination defined in claim 1, and wherein said means responsive to the output of said coincidence means comprises:
   means for introducing a predetermined delay in the output of said coincidence means;
   interval timing means responsive to the delayed output of said coincidence means to generate an output pulse of predetermined duration;
   second amplifier means responsive to said output pulse to generate a blanking signal of said predetermined duration; and
   means connecting the blanking signal output of said second amplifier means to said first amplifier means so that said receiver is shut off by said blanking signal after the leading edge and at least part of the trailing edge of true target video is passed to said error detector means, whereby said error detector means is unaffected by false target video following said true target video.

3. The combination defined in claim 2, and wherein said interval timing means comprises a one shot multivibrator.

4. The combination defined in claim 3, and wherein said coincidence means comprises a sensitivity control for selecting the point along the sloping leading edge of true target video which will initiate an output of the coincidence means, whereby adjustment of the time at which said blanking signal begins can be affected by said sensitivity control.

5. The combination as defined in claim 2, and further comprising:
an adjustable delay means connected to receive said range gate and operative to delay the leading edge thereof by a selected amount of time;
means connecting the delayed range gate output of said adjustable delay means as an input to said interval timing means;
said interval timing means being responsive to said delayed range gate input to initiate said pulse of predetermined duration in the absence of true target video and at a time slightly later than if initiated by true target video.

6. The combination defined in claim 5, and wherein said interval timing means comprises a one shot multivibrator.

7. The combination defined in claim 6, and wherein said adjustable delay means comprises:
a first inverter amplifier connected to receive said range gate and provide an inverted output corresponding to said range gate;
a potentiometer connected to said output of said first inverter amplifier;
a capacitor connected to the wiper of said potentiometer so as to be charged by the output of said first inverter amplifier at a rate selected by said potentiometer;
a second inverter amplifier connected to said capacitor and operative to provide an output condition indicative of the time that said capacitor is charged to a predetermined level; and
a third inverter amplifier responsive to said output condition of said second inverter amplifier to provide said delayed range gate as the output of said delay means.

8. In combination with a tracking radar, from which are available signals including video and range gate, and having first amplifier means and subsequent error detector means, electronic counter-counter-measure means comprising:
first protection and interface means connected to receive said video and comprising a first coupling capacitor as an input connection to a first voltage divider means including a potentiometer, and diode means connected across the output of said first voltage divider means;
second protection and interface means connected to receive said range gate and comprising a second coupling capacitor as an input connection to a second voltage divider means including a plurality of series connected resistors, and diode means connected across the output of said second voltage divider means;
a first time delay and inverter amplifier connected to receive the output of said first voltage divider means;
a second time delay and inverter amplifier connected to receive the output of said second voltage divider means;
first NAND gate means connected to receive the outputs of said first and second delay and inverter amplifiers and to provide an output condition representative of coincidence of a predetermined level of said video and presence of said range gate;
interval timing means responsive to said output condition of said first NAND gate means to initiate an output condition for a predetermined time period, said interval timing means comprising second, third, and fourth NAND gate means, said second and third NAND gate means being coupled by an RC network and a feedback path to function as a monostable multivibrator for determining said predetermined time period, said fourth NAND gate being operative to invert the output of said third NAND gate means;
a transistor amplifier means coupled to the output of said fourth NAND gate means and responsive thereto to generate as an output a video blanking pulse having a time duration equal to said predetermined time period starting at a point in time after occurrence of said predetermined level of said video, said point in time being determined at least in part by adjustment of said potentiometer and in part by time delays in said time delay and inverter amplifiers, in said NAND gate means, and in said transistor amplifier means; and
means coupling said blanking pulse output to said first amplifier means whereby said video is blanked for a period equal in duration to said predetermined time period and starting substantially at said point in time after occurrence of said predetermined level of said video.

* * * * *